(12) United States Patent
Gupta et al.

(10) Patent No.: US 12,537,986 B2
(45) Date of Patent: Jan. 27, 2026

(54) AUTOMATIC THEME GENERATION FOR A TELEVISION

(71) Applicant: GOOGLE LLC, Mountain View, CA (US)

(72) Inventors: Shashank Gupta, Bangalore (IN); Manoj Mani, Bangalore (IN)

(73) Assignee: GOOGLE LLC, Mountain View, CA (US)

(*) Notice: Subject to any disclaimer, the term of this patent is extended or adjusted under 35 U.S.C. 154(b) by 21 days.

(21) Appl. No.: 18/612,583

(22) Filed: Mar. 21, 2024

(65) Prior Publication Data

US 2025/0301193 A1    Sep. 25, 2025

(51) Int. Cl.
*H04N 21/258* (2011.01)
*H04N 21/472* (2011.01)

(52) U.S. Cl.
CPC ..... *H04N 21/25891* (2013.01); *H04N 21/472* (2013.01)

(58) Field of Classification Search
CPC .............. H04N 21/25891; H04N 21/472
USPC ........................................................ 725/38
See application file for complete search history.

(56) References Cited

U.S. PATENT DOCUMENTS

| 7,197,715 | B1 | 3/2007 | Valeria |
| 2006/0026655 | A1 | 2/2006 | Perez |
| 2008/0079750 | A1 | 4/2008 | Setlur |
| 2010/0222102 | A1 | 9/2010 | Rodriguez |
| 2012/0144416 | A1 | 6/2012 | Wetzer et al. |
| 2012/0311448 | A1 | 12/2012 | Achour et al. |
| 2013/0019257 | A1* | 1/2013 | Tschernutter .. H04N 21/234309 725/4 |
| 2021/0081180 | A1* | 3/2021 | Hsu ........................... G06F 8/38 |
| 2023/0177254 | A1 | 6/2023 | Ding et al. |
| 2024/0422371 | A1* | 12/2024 | Punja .................... G06N 3/044 |

OTHER PUBLICATIONS

Khan, et al., "Perspectives on the Design, Challenges, and Evaluation of Smart TV User Interfaces", Hindawi Scientific Programming, vol. 2022, Article ID 2775959, https://doi.org/10.1155/2022/2775959, 2022, 14 pages.

Khan, et al., "Towards the design of personalized adaptive user interfaces for smart TV viewers", Journal of King Saud University—Computer and Information Sciences, vol. 35, Iss. 9, https://doi.org/10.1016/j.jksuci.2023.101777, 2023, 25 pages.

* cited by examiner

*Primary Examiner* — Nnenna N Ekpo
(74) *Attorney, Agent, or Firm* — Brake Hughes Bellermann LLP

(57) ABSTRACT

According to an aspect, a method may receive, by a server computer, an input image representative of preferred media content for viewing by a user on a computing device. A method may identify aspects of the input image. A method may generate a theme for association with the input image based on the aspects of the input image. A method may dynamically adapting user interface elements and interactive components for a user interface of a television application based on the theme associated with the input image. A method may sending, by the server computer, the user interface for the television application to the computing device for display on the computing device, the user interface including the dynamically adapted user interface elements and interactive components.

20 Claims, 10 Drawing Sheets

AUTOMATIC THEME GENERATION FOR A TELEVISION

BACKGROUND

A television (TV) application may present various types of media content of interest to a user. The media content may have different formats such as streaming video and audio. The types of media content may include, but are not limited to, movies, television shows, sporting events, news items, short form videos, and music. In addition, or in the alternative, a variety of media content providers may deliver various types of media content for viewing by the user. The TV application may deliver a customized viewing experience to a user that spans the diverse types of media content provided by the variety of media content providers.

SUMMARY

A television (TV) application may customize and improve an experience of the user with the TV application. In some implementations, the TV application may deliver a customized look for the TV application based on the past history and preferences of the user for media content. For example, a theme of the TV application may be static and may not be appealing to many users. In addition, or in the alternative, a user may not have any input to or control of how the TV application looks. By customizing the look of the TV application, basing the look of the TV application on a theme as determined by past user history and preferences, the TV application may deliver a better user experience that positively impacts the engagement of the user with the TV application.

In some aspects, the techniques described herein relate to a method including: receiving, by a server computer, an input image representative of preferred media content for viewing by a user on a computing device; identifying aspects of the input image; generating a theme for association with the input image based on the aspects of the input image; dynamically adapting user interface elements and interactive components for a user interface of a television application based on the theme associated with the input image; and sending, by the server computer, the user interface for the television application to the computing device for display on the computing device, the user interface including the dynamically adapted user interface elements and interactive components.

In some aspects, the techniques described herein relate to a method, wherein the user interface elements include at least one of a color, shape, typography, or iconography.

In some aspects, the techniques described herein relate to a method, wherein the interactive components include at least one of a button or card.

In some aspects, the techniques described herein relate to a method, wherein the aspects of the input image include parameters for use in defining the theme for the input image.

In some aspects, the techniques described herein relate to a method, wherein a generative artificial intelligence framework generates the theme.

In some aspects, the techniques described herein relate to a method, further including training the generative artificial intelligence framework using the parameters.

In some aspects, the techniques described herein relate to a method, wherein an aspect of the input image is a color scheme for the input image.

In some aspects, the techniques described herein relate to a method, further including applying a color scheme to the user interface based on the color scheme for the input image.

In some aspects, the techniques described herein relate to a method, wherein the input image is one of a catalog of images representative of media content for viewing by the user.

In some aspects, the techniques described herein relate to a method, wherein receiving the input image includes uploading the input image from a catalog of images associated with an account of the user.

In some aspects, the techniques described herein relate to a non-transitory computer-readable medium storing executable instructions that when executed by at least one processor of a server computer cause the at least one processor to execute operations, the operations including: receiving an input image representative of media content for viewing by a user on a computing device; identifying aspects of the input image; generating a theme for association with the input image based on the aspects of the input image; dynamically adapting user interface elements and interactive components for a user interface of a television application based on the theme associated with the input image; and sending the user interface for the television application to the computing device for display on the computing device, the user interface including the dynamically adapted user interface elements and interactive components.

In some aspects, the techniques described herein relate to a non-transitory computer-readable medium, wherein the user interface elements include at least one of a color, shape, typography, or iconography.

In some aspects, the techniques described herein relate to a non-transitory computer-readable medium, wherein the interactive components include at least one of a button or card.

In some aspects, the techniques described herein relate to a non-transitory computer-readable medium, wherein the aspects of the input image include parameters for use in defining the theme for the input image.

In some aspects, the techniques described herein relate to a non-transitory computer-readable medium, wherein a generative artificial intelligence framework generates the theme; and wherein the operations further include training the generative artificial intelligence framework using the parameters.

In some aspects, the techniques described herein relate to a non-transitory computer-readable medium, wherein an aspect of the input image is a color scheme for the input image; and wherein the operations further include applying a color scheme to the user interface based on the color scheme for the input image.

In some aspects, the techniques described herein relate to a system including: at least one processor; and a non-transitory computer-readable medium storing instructions that when executed by the at least one processor cause the system to: receive an input image representative of media content for viewing by a user on a computing device; determine aspects of the input image; generate a theme for association with the input image based on the aspects of the input image; dynamically adapt user interface elements and interactive components for a user interface of a television application based on the theme associated with the input image; and send the user interface for the television application to the computing device for display on the computing device, the user interface including the dynamically adapted user interface elements and interactive components.

In some aspects, the techniques described herein relate to a system, wherein the user interface elements include at least one of a color, shape, typography, or iconography.

In some aspects, the techniques described herein relate to a system, wherein the interactive components include at least one of a button or card.

In some aspects, the techniques described herein relate to a system, wherein the aspects of the input image include parameters for use in defining the theme for the input image; wherein a generative artificial intelligence framework generates the theme; and wherein the instructions that when executed by the at least one processor further cause the system to train the generative artificial intelligence framework using the parameters.

The details of one or more implementations are set forth in the accompanying drawings and the description below. Other features will be apparent from the description and drawings, and from the claims.

DETAILED DESCRIPTION

Figure 1A:
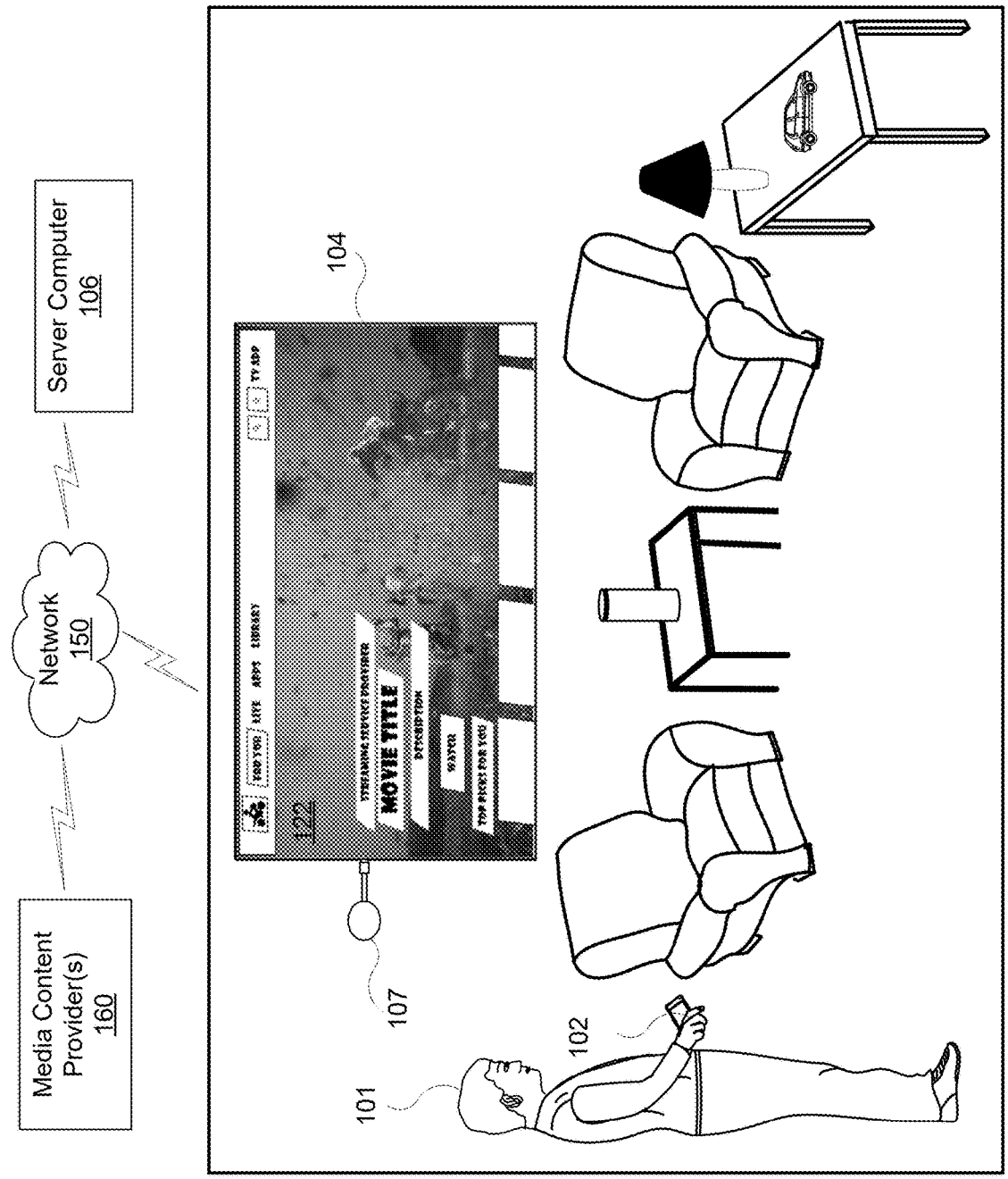
FIG. 1A illustrates an example of a first user interacting with a network-connected display device and a media adapter according to implementations described throughout this disclosure.

A television (TV) application may customize and improve an experience of a user with the TV application by providing a theme for the user interface for the TV application that may be based on preferences of the user. The TV application may customize the look, feel, and behavior of the TV application based on the theme with little to no manual input from the user such as the selection of a multitude of options. Because a user may have little to no control of the overall look, feel, and behavior of the user interface for the TV application, automatic theme generation may provide the user with an improved user experience which may positively impact the engagement of the user with the TV application. Automatic theme generation may enable a fast, easy, and scalable way for a TV application to adapt the look, feel, and behavior of the TV application to the interests of the user.

In some implementations, a dynamic adaptation of a user interface may be based on a theme as determined and defined by a trained machine learning model. In some implementations, the systems and methods may use generative AI (e.g., a generative artificial intelligence framework) to train the machine learning models. The machine learning model may determine or identify various characteristics or aspects of a selected user image that may define one or more parameters for associating with the selected image. The systems and methods may use the image parameters to generate a user interface theme. The user interface theme may define values for parameters associated with a user interface for the TV application. A single common TV application may provide a customized user interface for each user without having to provide different customized versions of the TV application to each user.

In some implementations, a user may provide an image (e.g., select and/or upload an image) that they would like to use as a basis for theme generation. The image may be stored in association with an account of a user. The user may log into the TV application using the same account. In some implementations, the user may select an image for media content as provided by the TV application such as a movie poster or a TV show poster. The selected image may be provided to a trained machine learning model that may associate one or more parameters for use in the theme generation with the image. A theme generator may use the parameters to generate a theme for the user interface. The TV application may use the values for the theme parameters when generating the user interface for the TV application.

At least one technical problem may be how a TV application may determine the preferences of the user for use in automatic theme generation without having the user input or otherwise indicate their preferences for theme generation. At least one technical solution may be the use of a generative artificial intelligence framework that may adaptively generate a theme based on past user history with the TV application. The past user history and activity characteristics associated with an account of the user may be obtained from a plurality of information sources that may include, but are not limited to, a TV application, a search engine, a mapping application, and an online retailer. The information sources may provide activity data related to activities of the account of the user by way of a respective software program or application. In addition, or in the alternative, the TV application may use a selected TV content image or a selected user image as a basis for the theme generation. The TV application may upload the image from a catalog of images stored in a data store in association with the account of the user. At least on technical effect may be the ability for a TV application to dynamically customize the overall look, feel, and behavior of the TV application to provide an improved experience to the user of the TV application with little to no input from the user.

The disclosure generally relates to systems and methods for determining and implementing a theme for a user interface for a TV application that may be automatically generated based on past user history with the TV application. The systems and methods may utilize generative artificial intelligence (AI) (e.g., a generative artificial intelligence framework) to dynamically adapt the user interface for the TV application based on one or more images selected by the user. The dynamic adaptation of the user interface may include, but is not limited to, adapting the elements of the user interface to mimic or reflect colors (e.g., a color scheme), shapes, typography, iconography, interactive components (e.g., buttons, cards, etc.), and/or other elements of an image or images preferred or selected by the user.

Figure 1B:
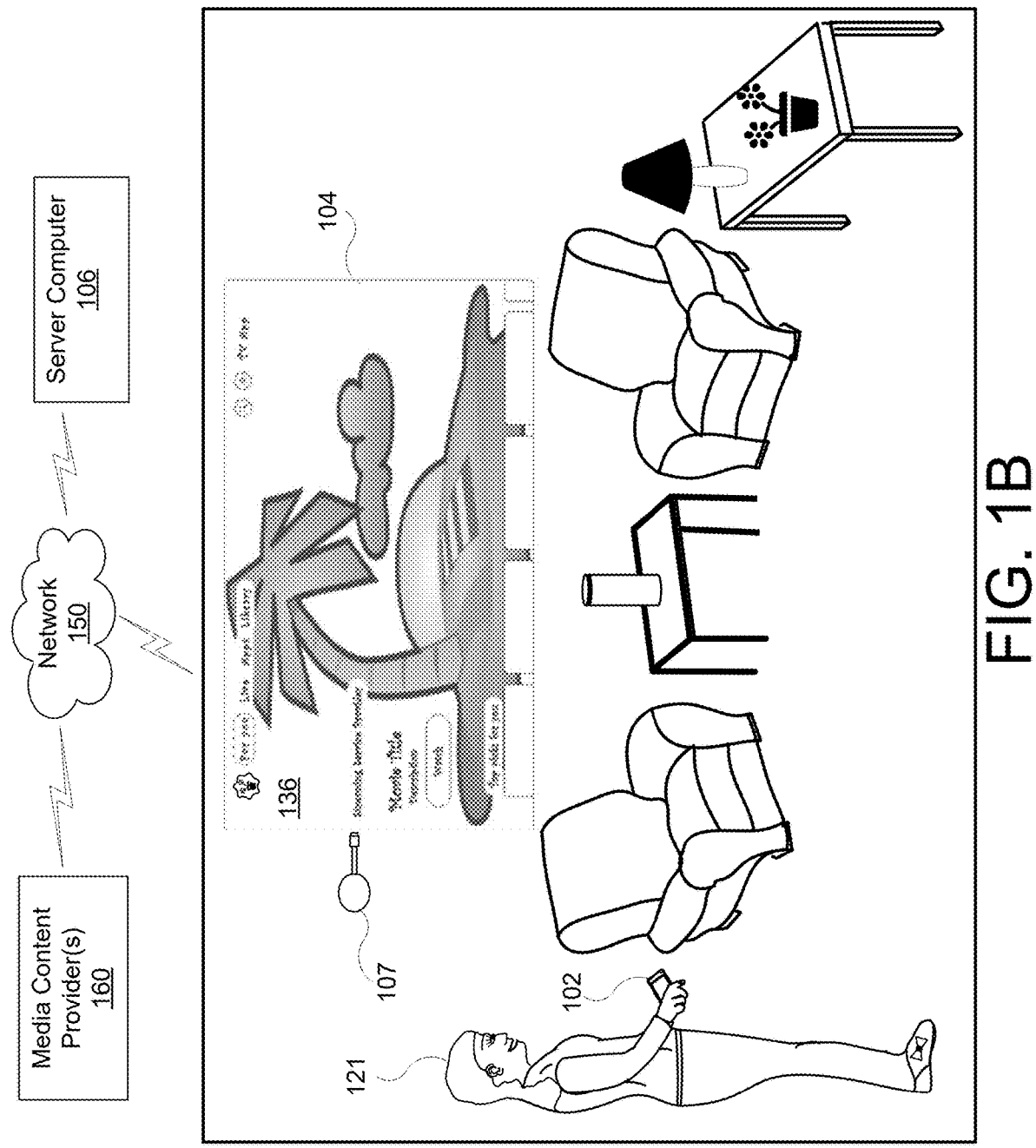
FIG. 1B illustrates an example of a second user interacting with a network-connected display device and a media adapter according to implementations described throughout this disclosure.
Figure 1C:
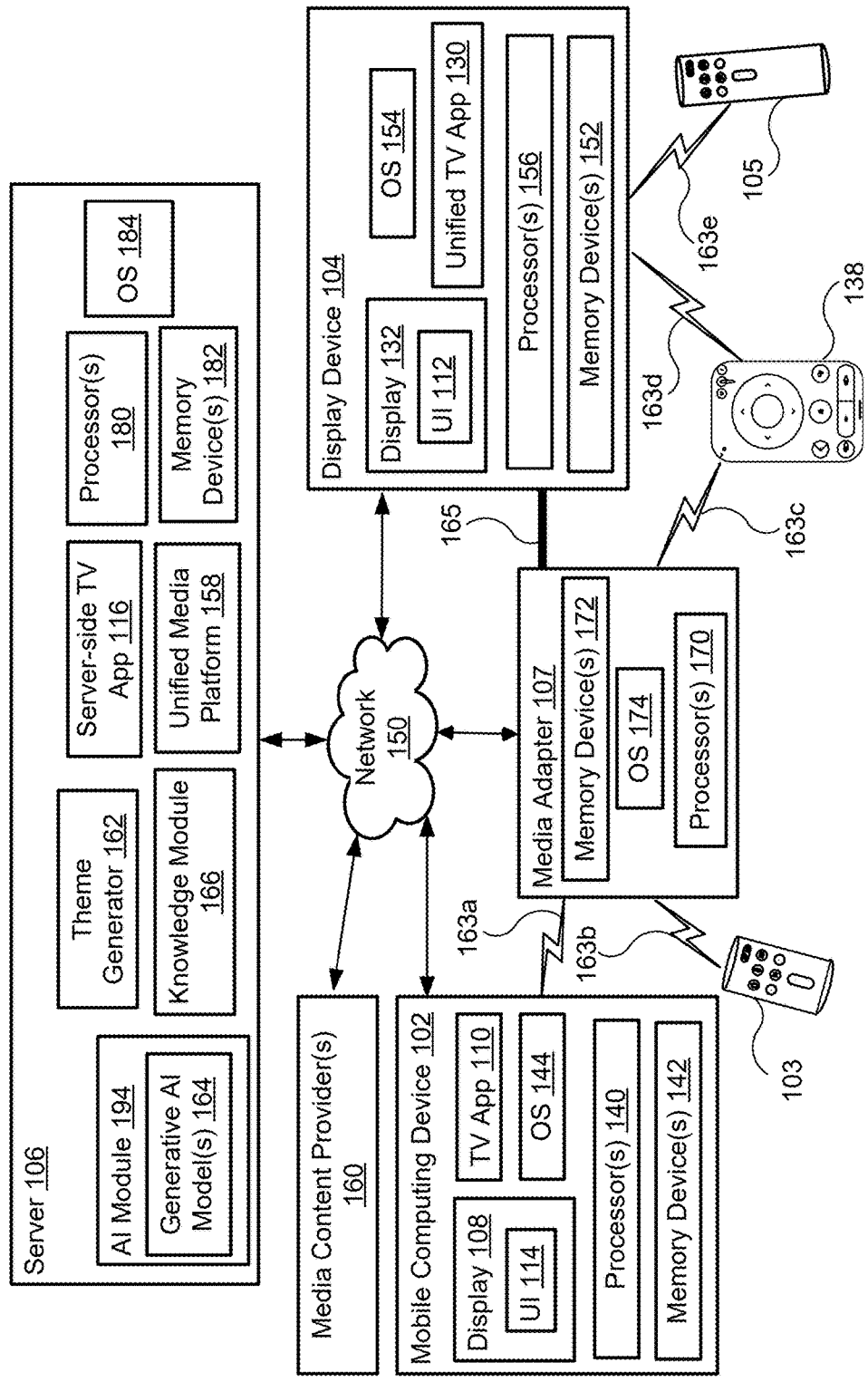
FIG. 1C illustrates an example system for customizing a user interface based on a theme, according to implementations described throughout this disclosure.

FIG. 1A illustrates an example of a first user 101 interacting with a network-connected display device 104 and a media adapter 107 according to implementations described throughout this disclosure. FIG. 1B illustrates an example of a second user 121 interacting with a network-connected display device (e.g., the network-connected display device 104) and a media adapter (e.g., the media adapter 107) according to implementations described throughout this disclosure. FIG. 1C illustrates an example system 100 for customizing a user interface based on a theme, according to implementations described throughout this disclosure.

Referring to FIGS. 1A-C, the network-connected display device 104 may communicate with a server computer 106 and media content providers 160 by way of a network 150. The media content providers 160, the network-connected display device 104, the server computer 106, and a mobile computing device 102 may interact with and communicate with one other by way of the network 150. In some implementations, the mobile computing device 102 may interface or connect to the media adapter 107 and/or the network-connected display device 104 by way of a wireless communication link that may be a short-range wireless connection such as, for example a Bluetooth connection or a Wi-Fi (e.g., direct Wi-Fi) connection.

In some implementations, one or more users (e.g., the first user 101 and the second user 121) may use and/or otherwise interact with the same network-connected display device (e.g., network-connected display device 104). In these implementations, the user may log into or otherwise access the account of the user by way of the network-connected display device 104 allowing each user to experience a customized themed user experience when interacting with a television (TV) application (e.g., unified television (TV) application 130) on the same network-connected display device (e.g., the network-connected display device 104). Though the interactions of the first user 101 and the second user 121 are described herein with reference to the system 100, in some implementations each user (e.g., the first user 101 and the second user 121) may use and/or otherwise interact with different network-connected display devices, mobile computing devices, media adapters, networks, and servers that perform like the system 100. In these implementations, each user experiences a customized themed user experience when interacting with a television (TV) application on the network-connected display device.

In some implementations, referring to FIG. 1A, the first user 101 may connect to and interact with a media adapter (e.g., the media adapter 107) by way of a network-connected display device (e.g., the network-connected display device 104) using a server-side television (TV) application (e.g., server-side TV application 116) installed on a server computer (e.g., the server computer 106). In some implementations, referring to FIG. 1B, the second user 121 may connect to and interact with a media adapter (e.g., the media adapter 107) by way of a network-connected display device (e.g., the network-connected display device 104) using a server-side television (TV) application (e.g., server-side TV application 116) installed on a server computer (e.g., the server computer 106). The media adapter 107 may be connected or interfaced to the network-connected display device 104. The network-connected display device 104 may be communicatively coupled or connected to the server computer 106 by way of the network 150. In these implementations, a unified media platform (UMP) 158 may provide or serve media content items from the media content providers 160 to the network-connected display device 104 by way of the media adapter 107.

In some implementations, referring to FIG. 1A, the first user 101 may interact with a network-connected display device (e.g., the network-connected display device 104) using a remote control device (e.g., a remote control device 105). In some implementations, referring to FIG. 1B, the second user 121 may interact with a network-connected display device (e.g., the network-connected display device 104) using a remote control device (e.g., the remote control device 105). In some implementations, a television (TV) application 110 may render a virtual remote control 138 in a user interface (e.g., UI 114) on a display (e.g., a mobile computing device display 108) on the mobile computing device 102. The virtual remote control 138 may allow the mobile computing device 102 to act as a remote control for the network-connected display device 104. The TV application 110 may render the virtual remote control 138 for use with the network-connected display device 104. The user may interact with the remote control device 105 and/or the virtual remote control 138 when selecting media content for viewing on the network-connected display device 104.

In some implementations, referring to FIG. 1A, the first user 101 may connect to and interact with a media adapter (e.g., the media adapter 107) using a TV application (e.g., the television (TV) application 110) installed on a mobile computing device (e.g., the mobile computing device 102). In some implementations, referring to FIG. 1B, the second user 121 may connect to and interact with a media adapter (e.g., the media adapter 107) using a TV application (e.g., the television (TV) application 110) installed on a mobile computing device (e.g., the mobile computing device 102). In some implementations, a user (e.g., the first user 101, the second user 121) may connect to and interact with a media adapter (e.g., the media adapter 107) using a media adapter remote control device (e.g., media adapter remote control device 103). In some implementations, the TV application 110 may render the virtual remote control 138 for use with the media adapter 107. The virtual remote control 138 may allow the mobile computing device 102 to act as a remote control for the media adapter 107. The user (e.g., the first user 101, the second user 121) may interact with the virtual remote control 138 and/or the media adapter remote control device 103 when interacting with the media adapter 107.

Figure 2:
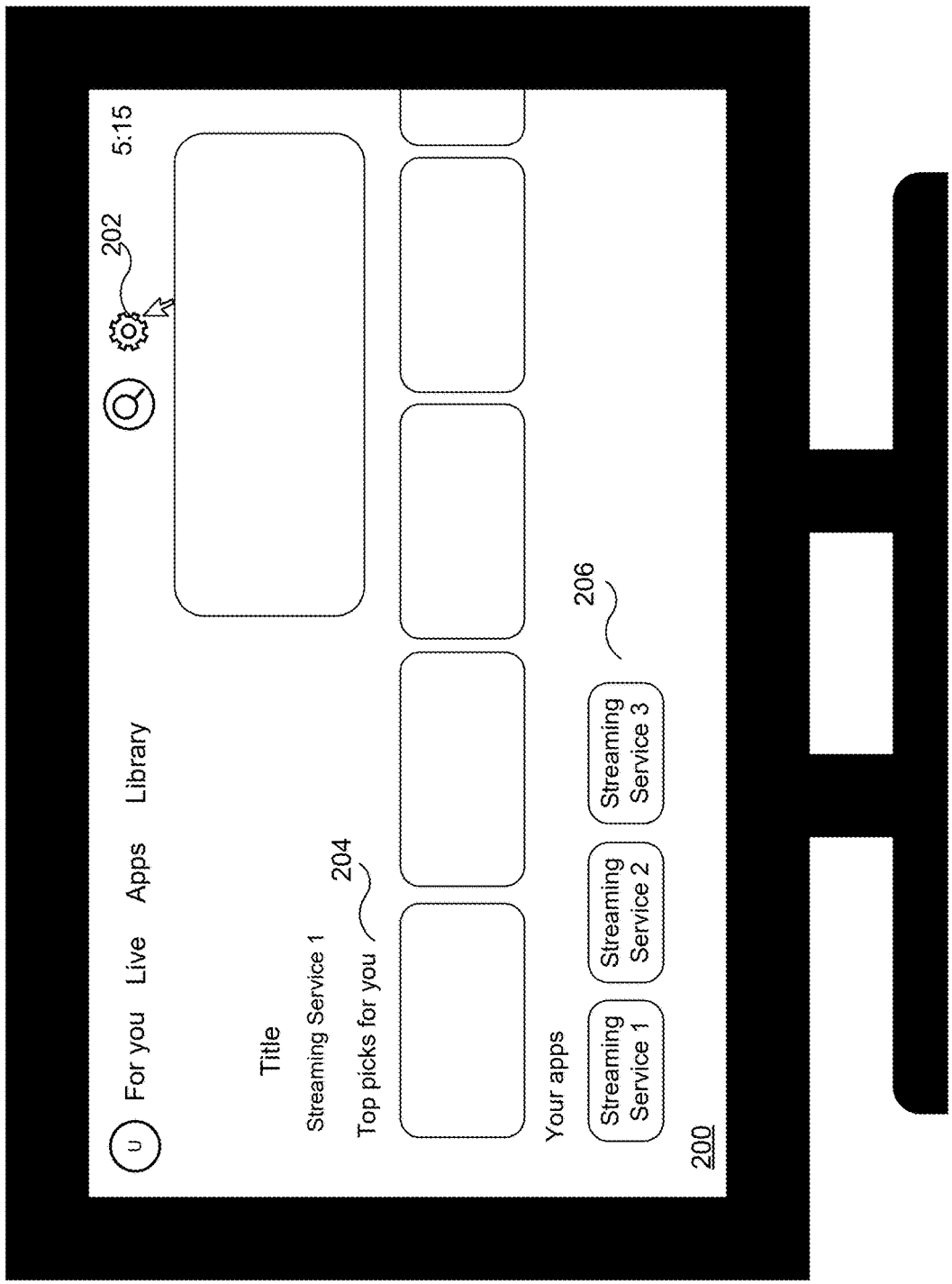
FIG. 2 illustrates an example user interface for a landing page of a TV application according to implementations described throughout this disclosure.
Figure 3A:
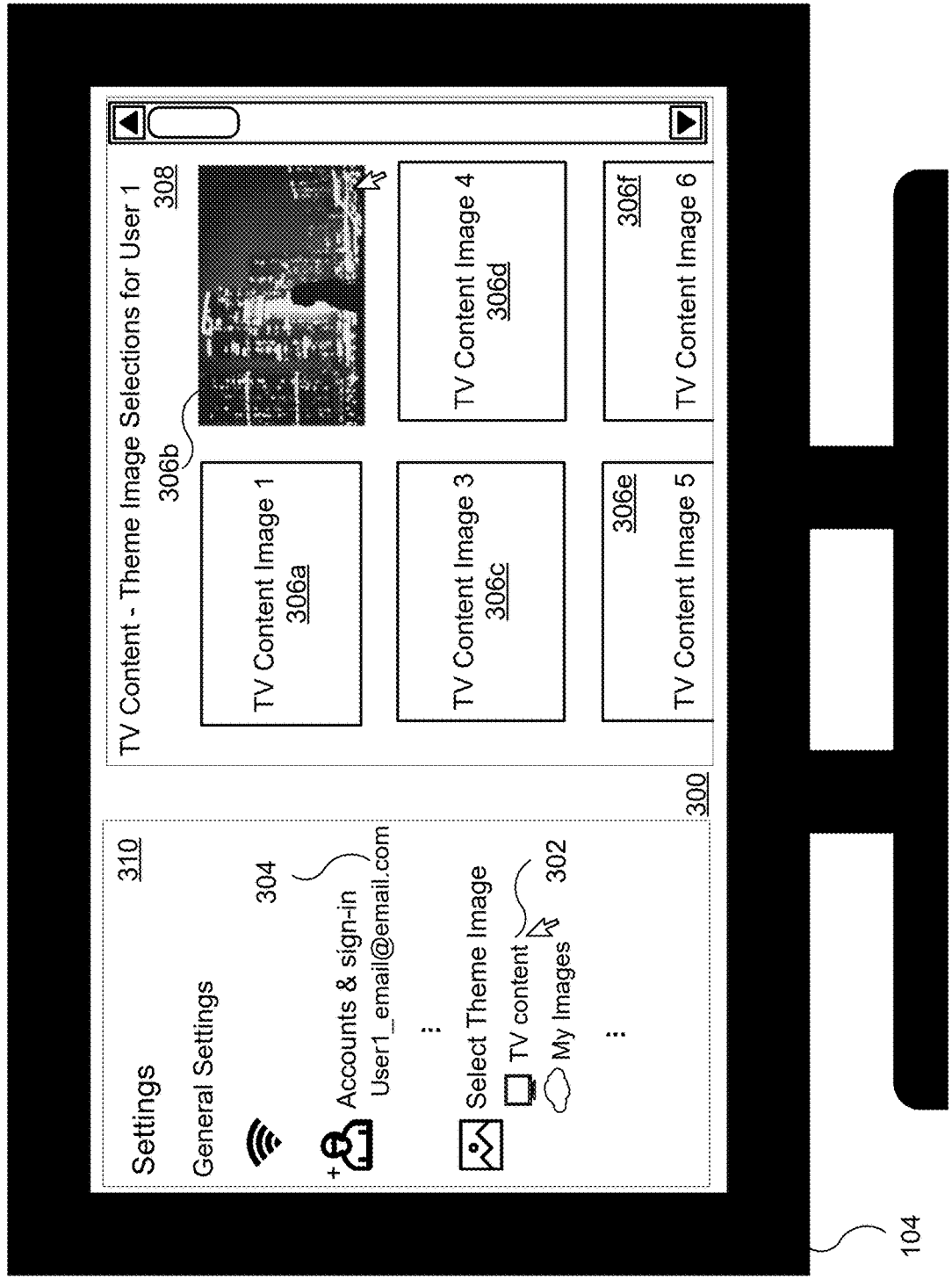
FIG. 3A illustrates an example user interface for selecting TV content for use as a basis for a theme for a user interface for a user of a TV application according to implementations described throughout this disclosure.

FIG. 3A illustrates an example user interface 300 for selecting TV content for use as a basis for a theme for a user interface for a first user (e.g., the first user 101) of a TV application (e.g., the unified television application 130) according to implementations described throughout this disclosure. Referring to FIGS. 1A, 1C, and 2, the first user 101 may select or click on a settings icon 202. In response to selecting or clicking on the settings icon 202, the unified television application 130 may present the user interface 300 on the display 132 of the network-connected display device 104. The user interface 300 may display a settings menu 310. The settings menu 310 provides a user account indication 304. For example, the user account indication 304 may be an email address for the first user 101.

The settings menu 310 may allow the first user 101 to select an image for use as a basis for theme generation for a user interface. In some implementations, the first user 101 may select or click on a TV content option 302. In response to the selection of the TV content option 302, the unified television application 130 may display an image selection window 308. The image selection window 308 may present the first user 101 with thumbnail images for TV content (e.g., TV content images 306a-f). The TV content images 306a-f may be images from movies, TV shows, and other types of media content that may be of interest for viewing by the first user 101. The image selection window 308 may include TV content images 306a-f for selection by the first user 101 as a theme for a user interface. For example, the image selection window may include one or more images (e.g., TV content images 306a-f) presented to the user by the unified television application 130. The TV content images 306a-f may include, for example, movie posters, TV show posters, etc.

The server-side TV application 116 interfacing with a knowledge module 166 may determine the TV content images 306a-f for selection by the first user 101 as a basis for a user interface theme based on past user history and preferences of the user for media content. In addition, or in the alternative, the server-side TV application 116 interfacing with the knowledge module 166 may determine the TV content images 306a-f for selection by the first user 101 as a basis for a user interface theme based on past user history and activity characteristics associated with an account of the user. The server-side TV application 116 may provide or send thumbnail images for each of the TV content images 306a-f for display in the image selection window 308.

In some implementations, referring to FIG. 1C, the first user 101 may select TV content image 306b. The TV content image 306b may represent recommended media content for viewing by the first user 101. For example, the server-side TV application 116 may receive an indication of the selection of the TV content image 306b from the unified television application 130. The server-side TV application 116 may upload or otherwise obtain the TV content image 306b and provide the TV content image 306b to an artificial intelligence (AI) module 194. The AI module 194 may include one or more generative artificial intelligence (AI) model(s) 164. The AI module 194 including the generative artificial intelligence (AI) model(s) 164 may be considered a generative artificial intelligence framework.

Figure 4:
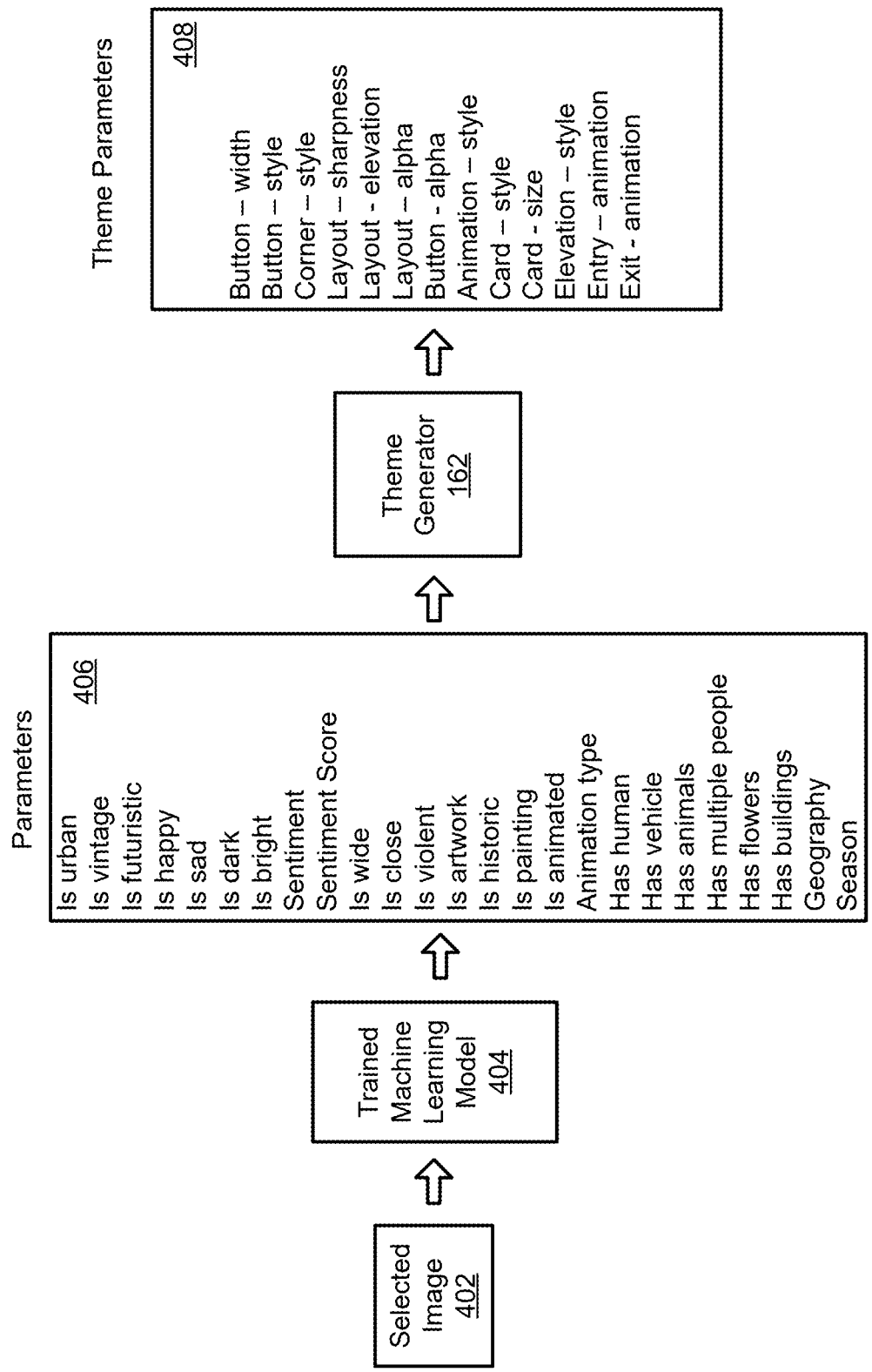
FIG. 4 illustrates an example process for determining a theme for use as a basis for a user interface for a TV application according to implementations described throughout this disclosure.

FIG. 4 illustrates an example process for determining a theme for use as a basis for a user interface for a TV application according to implementations described throughout this disclosure. Referring to FIGS. IC, 3A, and 4, the AI module 194 may provide the TV content image 306b as an input image 402 to a trained machine learning model 404 included in the generative AI model(s) 164. The trained machine learning model 404 may determine aspects of the input image 402 such as colors (e.g., a color scheme), shapes, typography, iconography, interactive components (e.g., buttons, cards, etc.), and/or other elements of the input image 402 for use as a basis of a theme for the input image 402. The trained machine learning model 404 may consider these aspects of the input image 402 and determine or extract one or more parameters 406 from the TV content image 306b for associating with the TV content image 306b.

The trained machine learning model 404 may provide the one or more parameters 406 to a theme generator 162. The theme generator 162 may use the one or more parameters 406 to define a theme for associating with the input image 402. The theme generator 162 may generate one or more theme parameters 408. The theme generator 162 may provide the one or more theme parameters 408 to the server-side TV application 116. The server-side TV application 116 may generate a customized themed user interface (e.g., a first user interface 122) for the first user 101 using the one or more theme parameters 408. The server-side TV application 116 may send or provide the customized themed user interface (e.g., the first user interface 122) to the network-connected display device 104 for use by the unified television application 130. The unified television application 130 may display the customized themed user interface (e.g., the first user interface 122) on the display 132.

Figure 3B:
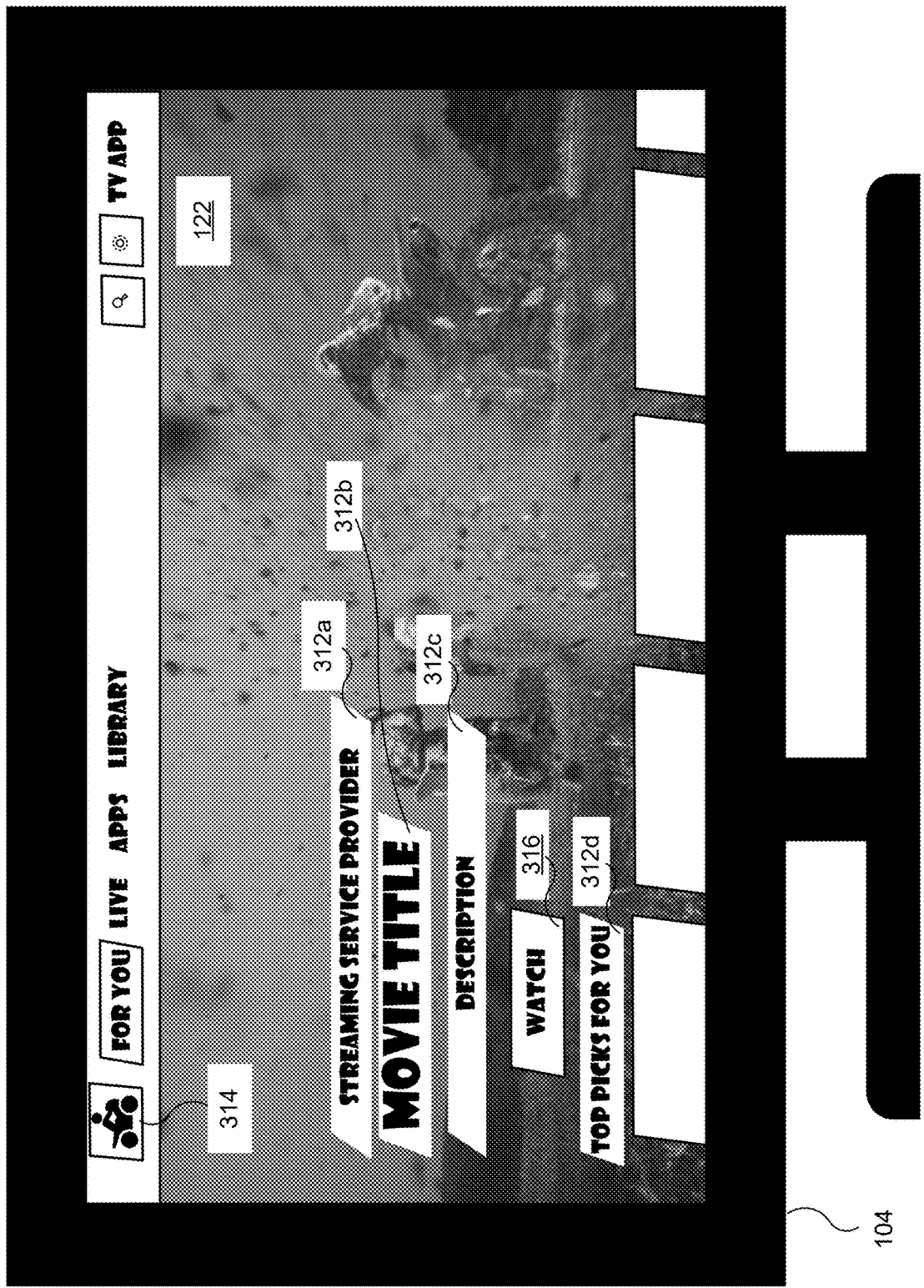
FIG. 3B illustrates an example user interface for a TV application based on a theme associated with a user of a TV application according to implementations described throughout this disclosure.

FIG. 3B illustrates an example user interface (e.g., the first user interface 122 as shown in FIG. 1A) for a TV application (e.g., unified television application 130) based on a theme associated with a user (e.g., the first user 101) according to implementations described throughout this disclosure. Referring to FIGS. 1A and 3A, a theme for the first user interface 122 for the first user 101 may mimic or reflect the colors (e.g., a color scheme), shapes, typography, iconography, interactive components (e.g., buttons, cards, etc.), and/or other elements of the TV content image 306b.

For example, the server-side TV application 116 may generate a theme for the first user interface 122 based on the one or more theme parameters 408 received from the theme generator 162. The server-side TV application may dynamically adapt user interface elements 312a-d based on the theme. For example, user interface elements 312a-d may include sharp corners across the user interface elements 312a-d based on the angular corners of the buildings in the TV content image 306b. In another example, the overall color or color scheme for the user interface may be dark with saturated colors based on the colors and darkness (e.g., the color scheme) of the TV content image 306b. In another example, a profile icon 314 for the first user 101 may be set to a riding vehicle based on modes of transportation that may be included in the TV content image 306b. In another example, an interactive element (e.g., watch button 316) may include sharp corners reflective of the theme.

Referring to FIGS. 1B and 2, the second user 121 may interface with the unified television application 130 as described herein. The second user 121 may log into an account of the second user. The account of the second user may be associated with the unified television application 130. Once logged in, the second user 121 may launch the unified television application 130 on the network-connected display device 104. The unified television application 130 may interface with the server-side television (TV) application 116. In response to the second user 121 launching the unified television application 130, the unified television application 130 may provide the user interface 200 as a user interface (UI) 112 on a display 132 of the network-connected display device 104. The user interface 200 may be customized to provide media content item recommendations 204 of interest to the second user 121. The user interface 200 may be customized to provide streaming service provider applications 206 of interest to second user 121.

Figure 5A:
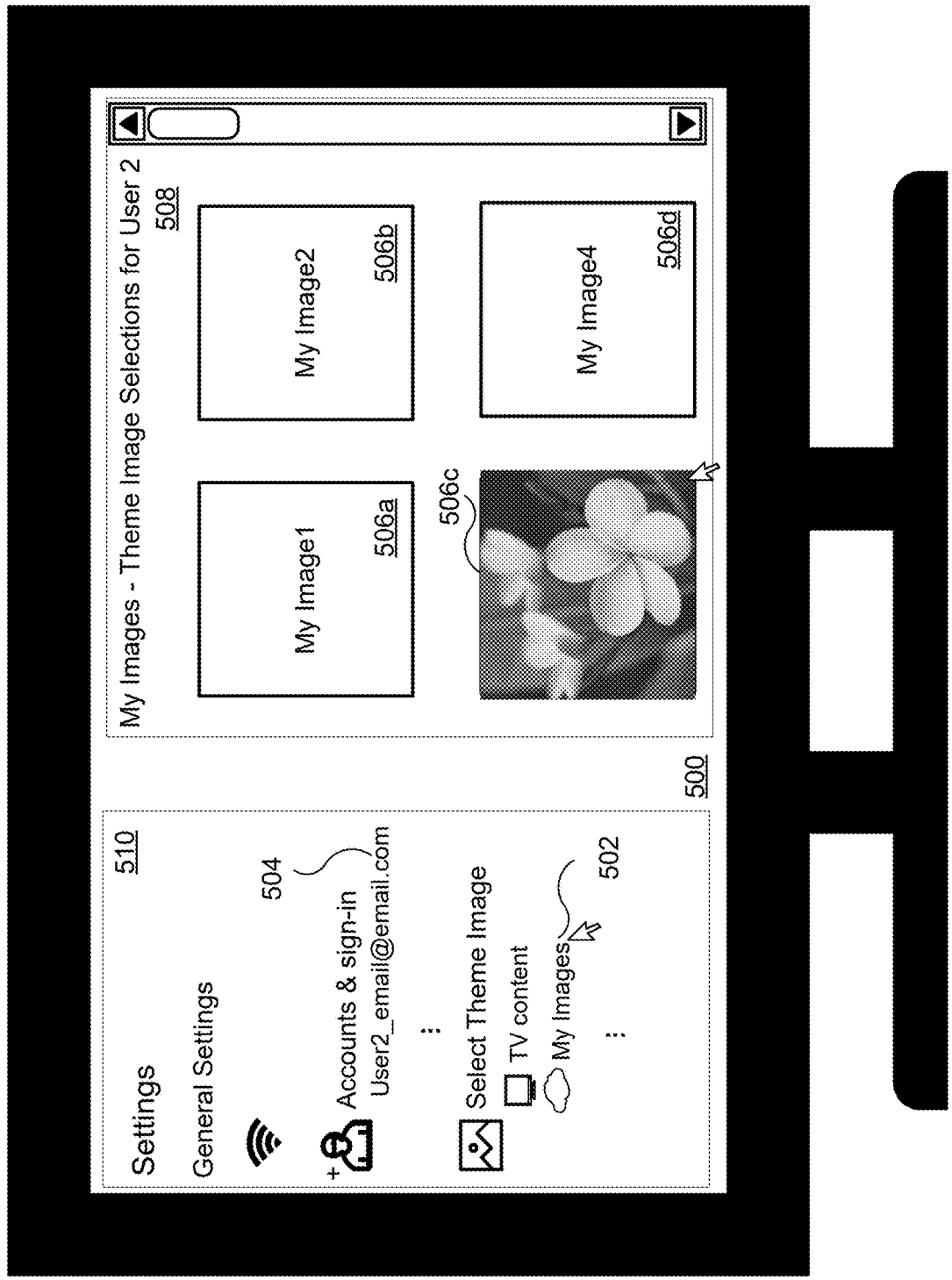
FIG. 5A illustrates an example user interface for selecting images associated with an account of a user for use as a basis for a theme for a user interface of a TV application according to implementations described throughout this disclosure.

FIG. 5A illustrates an example user interface 500 for selecting an image for use as a basis for a theme for a user interface for a user (e.g., the second user 121) of a TV application (e.g., unified television application 130) according to implementations described throughout this disclosure. Referring to FIGS. 1B, 1C, and 2, the second user 121 may select or click on the settings icon 202. In response to selecting or clicking on the settings icon 202, the unified television application 130 may present the user interface 500 on the display 132 of the network-connected display device

104. The user interface 500 may display a settings menu 510. The settings menu 510 provides a user account indication 504. For example, the user account indication 504 may be an email address for the second user 121.

The settings menu 510 may allow the second user 121 to select an image for use as a basis for theme generation for a user interface. In some implementations, the second user 121 may select or click on a my images option 502. In response to the selection of the my images option 502, the unified television application 130 may display an image selection window 508. The image selection window 508 may present to the second user 121 thumbnail images (e.g., images 506a-d) of images associated with the account of the user. The image selection window 508 may display thumbnail images of a catalog of images stored in a datastore in association with the account of the second user 121. The second user 121 may select an image from the images 506a-d for use as a theme for a user interface.

In some implementations, the images 506a-d may be images associated with the account of the second user 121. For example, the images 506a-d may be artworks, photos, stock images, or other images included in a catalog of images associated with the account of the second user 121. The second user 121 may store the images 506a-d in a datastore associated with the account of the user. The server-side TV application 116 may provide thumbnail images for the images 506a-d to the unified television application 130. The unified television application 130 may present the thumbnail images for the images 506a-d for selection by the second user 121 as a basis for a user interface theme based on preferences of the user. The server-side TV application 116 may determine the images 506a-d for selection by the second user 121 as a basis for a user interface theme based on past user history and activity characteristics associated with an account of the user and provided to the server-side TV application by the knowledge module 166.

In some implementations, referring to FIG. 1C, the second user 121 may select image 506c. The selection of the image 506c may represent preferred media content for viewing by the second user 121. For example, the server-side TV application 116 may receive an indication of the selection of the image 506c from the unified television application 130. The server-side TV application 116 may upload or otherwise obtain the image 506c from the datastore. The server-side TV application 116 may provide the image 506c to the artificial intelligence (AI) module 194.

Referring to FIGS. 1C, 4, and 5A, the AI module 194 may provide the image 506c as an input image 402 to the trained machine learning model 404 included in the generative AI model(s) 164. The trained machine learning model 404 may determine aspects of the input image 402 such as colors (e.g., a color scheme), shapes, typography, iconography, interactive components (e.g., buttons, cards, etc.), and/or other elements of the input image 402 for use as a basis of a theme for the input image 402. The trained machine learning model 404 may consider these aspects of the input image 402 and determine or extract one or more parameters 406 from the TV content image 306b for associating with the TV content image 306b. The trained machine learning model 404 may determine or extract one or more parameters 406 from the image 506c for associating with the image 506c. The trained machine learning model 404 may provide the one or more parameters 406 to the theme generator 162. The theme generator 162 may use the one or more parameters 406 to define a theme for associating with the input image 402. The theme generator 162 may generate the one or more theme parameters 408. The theme generator 162 may provide the one or more theme parameters 408 to the server-side TV application 116. The server-side TV application 116 may generate a customized themed user interface (e.g., a first user interface 122) for the first user 101 using the one or more theme parameters 408. The server-side TV application 116 may send or provide the customized themed user interface (e.g., the second user interface 136) to the network-connected display device 104 for use by the unified television application 130. The unified television application 130 may display the customized themed user interface (e.g., the second user interface 136) on the display 132.

Figure 5B:
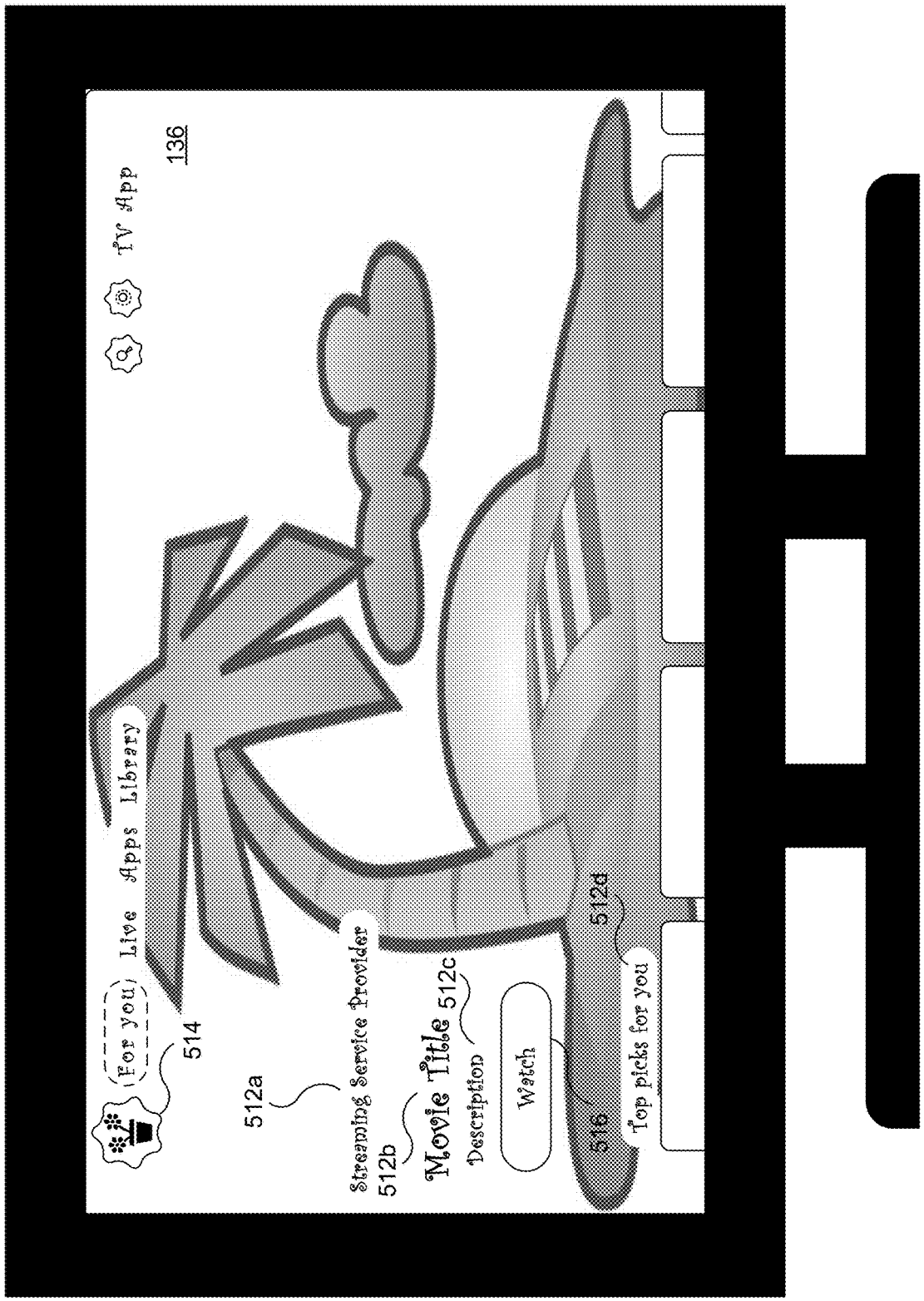
FIG. 5B illustrates another example user interface for a TV application based on a theme associated with a user of a TV application according to implementations described throughout this disclosure.

FIG. 5B illustrates another example user interface (e.g., the second user interface 136 as shown in FIG. 1B) for a TV application (e.g., unified television application 130) based on a theme associated with a user (e.g., the second user 121) according to implementations described throughout this disclosure. Referring to FIGS. 1B and 5A, a theme for the second user interface 136 for the second user 121 may mimic or reflect the colors (e.g., color scheme), shapes, typography, iconography, interactive components (e.g., buttons, cards, etc.), and/or other elements of the TV content image 306b.

For example, the server-side TV application 116 may generate a theme for the second user interface 136 based on the one or more theme parameters 408 received from the theme generator 162. The server-side TV application may dynamically adapt user interface elements 512a-d based on the theme. For example, user interface elements 512a-d may include soft, rounded corners across the user interface elements 512a-d based on the soft smooth lines of the flowers in the image 506c. In another example, the colors or color scheme for the second user interface 136 may be pastels based on the colors (e.g., color scheme) of the image 506c. In another example, a profile icon 514 for the second user 121 may be set to some flowers based on the flowers included in the image 506c. In another example, an interactive element (e.g., watch button 516) may include soft, rounded corners reflective of the theme.

Referring to FIG. 1C, the server-side TV application 116 may interface with the theme generator 162. The theme generator 162 may receive information and data from the server-side TV application 116 and from a knowledge module 166. As described with reference to FIG. 4, the theme generator 162 may receive parameters 406 from the trained machine learning model 404. The parameters 406 may characterize the look and feel of the input image 402. In addition, or in the alternative, the server-side TV application 116 may provide the information and data to the AI module 194 for use by the model(s) 164 (e.g., the trained machine learning model 404). The theme generator 162 may generate and provide one or more theme parameters 408 to the server-side TV application 116. The server-side TV application 116 may provide the theme parameters to the unified television application 130 for use by the unified television application 130 when generating a user interface for display as the UI 112 on the display 132.

The server computer 106 may include the unified media platform (UMP) 158. The UMP 158 may facilitate the providing of media content items for playing on the network-connected display device 104. The UMP 158 may interface with the unified television application 130 executing on the network-connected display device 104 and the media content providers 160 to provide media content items to the network-connected display device 104 for playing on the network-connected display device 104. In some implementations, the UMP 158 may facilitate the providing of media content items for playing on the mobile computing device 102. The UMP 158 may interface with the application 110 executing on the mobile computing device 102 and the media content providers 160 to provide media content items to the mobile computing device 102 for playing on the mobile computing device 102. In some implementations, the UMP 158 may facilitate the providing of a media content item to the media adapter 107. The media adapter 107 may stream the media content item from the media content providers 160 to the network-connected display device 104.

The server computer 106 may include the theme generator 162. The theme generator 162 may interface with a knowledge module 166, the server-side TV application 116, and the artificial intelligence (AI) module 194. As described herein referring to FIG. 4, the theme generator 162 may generate one or more theme parameters 408 for use in applying a theme to a user interface for a TV application (e.g., unified television application 130).

The server computer 106 may include the artificial intelligence (AI) module 194. The AI module 194 may receive information and data from the mobile computing device 102 and/or the network-connected display device 104 to build generative artificial intelligence (AI) model(s) 164 for use by the AI module 194. In some implementations, the trained machine learning model 404 included in the generative AI model(s) 164 may provide one or more parameters 406 associated with the look and feel of the input image 402 to the theme generator 162. The AI module 194 and the trained machine learning model 404 may interface with the theme generator 162 to dynamically adapt the user interface elements and interactive components for a user interface of a TV application based on the theme associated with the input image 402.

The server computer 106 may include the knowledge module 166. The knowledge module 166 may include information associated with media content items provided by the media content providers 160. In some implementations, the knowledge module 166 may generate media content recommendations for associating with an account of a user based, in part, on a multi-dimensional user activity characteristic associated with the account of the user and the information associated with media content items provided by the media content providers 160. The user activity characteristic associated with the account of the user may be obtained from a plurality of information sources that may include, but are not limited to, a search engine, a mapping application, and an online retailer. The information sources may provide activity data related to activities of the account of the user by way of a respective software program or application.

The knowledge module 166 may interface with the server-side TV application 116 to help determine TV content images and user images for presenting to the user as recommendations for theme selections. For example, the knowledge module 166 may provide information and data related to past user history and preferences of the user for media content to the server-side TV application 116. In addition, or in the alternative, knowledge module 166 may provide information and data related to past user history and activity characteristics associated with an account of the user to the server-side TV application 116. Referring to FIG. 3A, the server-side TV application 116 may interface with the unified television application 130 to provide recommended TV content images (e.g., the TV content images 306a-f) for selection by a user (e.g., the first user 101) as a basis for a user interface theme. Referring to FIG. 5A, the server-side TV application 116 may interface with the unified television application 130 to provide recommended user images (e.g., the images 506a-d) for selection by a user (e.g., the second user 121) as a basis for a user interface theme.

The server computer 106 may include the server-side TV application 116. The server-side TV application 116 may facilitate providing the media content items to the unified television application 130 for playing on the network-connected display device 104. In addition, or in the alternative, the server-side TV application 116 may interface to the unified television application 130. The server-side TV application 116 may provide recommended TV content images and/or user images to the unified television application 130 for selection by a user as a basis of a theme for a user interface of the unified television application 130. The unified television application 130 may provide the server-side TV application 116 with information and data related to user activities and interactions with the unified television application 130 for use by the knowledge module 166.

The mobile computing device 102 may be configured to execute the TV application 110. The mobile computing device 102 may include the mobile computing device display 108 configured to display the UI 114. A user may interact with the UI 114 to set up, control, and interact with the TV application 110. In some implementations, as described, the TV application 110 may display the virtual remote control 138 in the UI 114 allowing a user to interact with and control the network-connected display device 104 and/or the media adapter 107.

The mobile computing device 102 may be any type of computing device that includes one or more processors (processor(s) 140), one or more memory devices (memory device(s) 142), and an operating system 144. The mobile computing device 102 may be a smartphone, a tablet, a wearable device, a laptop computer, or a desktop computer. In some implementations, the operating system 144 may be system software that manages computer hardware, software resources, and provides common services for computing programs.

In some implementations, the mobile computing device 102 may be a tablet, a smartphone, or a wearable. In these implementations, the operating system 144 may be referred to as a mobile operating system. The mobile operating system may be configured to execute on devices that, in general, include display devices that may be smaller in size than, for example, a display device included in a laptop computer or a desktop computer. In some implementations, the mobile computing device 102 may be a laptop computer. In these implementations, the operating system may be referred to as a laptop or desktop operating system. In these implementations, the operating system 144 may be an operating system designed for a display that is larger in size than that included in a tablet, a smartphone, or a wearable.

In some implementations, the media adapter 107 (e.g., a casting device, a media streaming device, a media streaming player, a set-top box) may be interfaced with or connected to the network-connected display device 104. The media adapter 107 may interact with and communicate with the media content providers 160, the server computer 106, and the mobile computing device 102 when providing media content to the network-connected display device 104. In some implementations, the media adapter 107 may be embedded in and/or an integrated part of the network-connected display device 104.

The media content providers 160 may include a variety of streaming service and media content sources and service platforms. The media adapter 107 may facilitate providing (e.g., streaming) media content (e.g., streaming video such as movies, TV shows, etc.) from one or more streaming services included in the media content providers 160 to the network-connected display device 104. For example, the media adapter 107 may directly connect to a connector on the network-connected display device 104 by way of connection 165. The media adapter 107 may provide digital video and/or audio to the network-connected display device 104. For example, the media adapter 107 may connect to a high-definition multimedia interface (HDMI) connector included in the network-connected display device 104. Examples of the media adapter 107 may include, but are not limited to, a set-top box, a television box, and a streaming media adapter.

In some implementations, the mobile computing device 102 may connect to or interface with the media adapter 107 by way of a wireless communication link 163b. Wireless communication links 163a-e may be short-range wireless connections such as a Bluetooth connection. In some examples, wireless communication links 163a-e may be a Wi-Fi (e.g., direct Wi-Fi) connection.

The media adapter 107 may be any type of computing device that includes one or more processors (processor(s) 170), one or more memory devices (memory device(s) 172), and an operating system 174. In some implementations, the processor(s) 170 may include a system on a chip (SoC). The SoC may include a central processing unit (CPU), a graphic processing unit (GPU), one or more memory interfaces, and one or more input/output interfaces and devices. In some implementations, the operating system 174 may be system software that manages computer hardware, software resources, and provides common services for computing programs.

The network-connected display device 104 may include the unified television application 130. The unified television application 130 may keep a record of the interactions of the user with the media content received from the server computer 106. The network-connected display device 104 may send the record of the interactions to the server computer 106 for use in determining media content recommendations for the user. In addition, or in the alternative, the network-connected display device 104 may send the record of the interactions to the server computer 106 for use in determining TV content image and user images for recommending to a user for a user interface theme.

In some implementations, the network-connected display device 104 may be configured to execute the unified television application 130. For example, the network-connected display device 104 may be a smart television. For example, a smart television may be a network-connected television that may connect to media content providers (e.g., media content providers 160) by way of a network (e.g., the network 150). The media content providers may source media content to the smart television. In these implementations, a user may interact with the unified television application 130 to access media content from the media content providers 160. The unified television application 130 may interface with the server computer 106, and specifically with the server-side TV application 116. The unified television application 130 may provide similar functionality to the user as that provided by an application executing on the media adapter 107. For example, executing the unified television application 130 by the network-connected display device 104 allows the network-connected display device 104 to obtain a media content recommendation stream from the server computer 106.

The network-connected display device 104 may be configured to connect to the network 150. In some implementations, the network-connected display device 104 is a television (e.g., a smart television (TV)). The network-connected display device 104 may include one or more processors (processor(s) 156), one or more memory devices (memory device(s) 152), and an operating system (OS) 154. The operating system 154 may execute (or assist with executing) the unified television application 130.

In some implementations, the operating system 154 may be a browser application. A browser application is a web browser configured to access information on the Internet by way of a network (e.g., the network 150). A browser application may launch one or more browser tabs in the context of one or more browser windows in the browser application. In some implementations, the operating system 154 is a Linux-based operating system configured to execute (or assist with executing) the unified television application 130.

The system 100 may include one or more server computers (e.g., the server computer 106) configured to interface with the mobile computing device 102, the media adapter 107, the media content providers 160, and the network-connected display device 104 by way of the network 150. In some implementations, the network 150 may establish a wireless communication link between the network-connected display device 104, the mobile computing device 102, the media adapter 107, the media content providers 160, and the server computer 106.

The mobile computing device 102 may include the mobile computing device display 108. In some implementations, the mobile computing device display 108 is a display device such as a liquid crystal display (LCD), a light-emitting diode (LED) display, an organic light-emitting diode (OLED) display, or an active-matrix organic light-emitting diode (AMOLED) display. The network-connected display device 104 may include the display 132. In some implementations, the display 132 is a display device such as a liquid crystal display (LCD), a light-emitting diode display (LED) display, a plasma display, a quantum dot light-emitting diode display (QLED) display, or an organic light-emitting diode (OLED) display.

The processor(s) 156, the processor(s) 140, the processor(s) 170, and the processor(s) 180 may be formed in a substrate configured to execute one or more machine executable instructions or pieces of software, firmware, or a combination thereof. The processor(s) 156, the processor(s) 140, the processor(s) 170, and the processor(s) 180 may be semiconductor-based. For example, the processor(s) 156, the processor(s) 140, the processor(s) 170, and the processor(s) 180 may include semiconductor material that can perform digital logic.

The memory device(s) 152, the memory device(s) 142, the memory device(s) 172, and the memory device(s) 182 may include main memory that stores information in a format that can be read and/or executed by the processor(s) 156, the processor(s) 140, the processor(s) 170, and the processor(s) 180 respectively. The memory device(s) 152, the memory device(s) 142, the memory device(s) 172, and the memory device(s) 182 may include one or more random-access memory (RAM) devices and/or one or more read-only memory (ROM) devices.

The memory device(s) 152, memory device(s) 142, the memory device(s) 172, and the memory device(s) 182 may store applications that, when executed by the processor(s) 156, the processor(s) 140, the processor(s) 170, and the processor(s) 180, respectively, perform operations. For example, the memory device(s) 142 may store the operating system 144 and the TV application 110 that, when executed by the processor(s) 140, may perform operations on the mobile computing device 102. For example, the memory device(s) 152 may store the operating system 154 and the unified television application 130 that, when executed by the processor(s) 156, may perform operations on the network-connected display device 104.

In some implementations, the memory device(s) 182 may represent any kind of (or multiple kinds of) memory (e.g., RAM, flash, cache, disk, tape, etc.). In some implementations, the memory device(s) 182 may include external storage, e.g., memory physically remote from but accessible by the server computer 106. The memory device(s) 182 may include a catalog of images for a user that may be used by the AI module 194 as a basis for a theme for a user interface for a TV application (e.g., the unified TV application 130).

The server computer 106 may include one or more modules, engines, or applications representing specially programmed software. In some implementations, the server computer 106 may include the operating system 184, the server-side TV application 116, the knowledge module 166, the AI module 194, the generative AI model(s) 164, the UMP 158, the theme generator 162, processor(s) 180, and the device(s) 182. For example, the memory device(s) 182 may store the operating system 184, the server-side TV application 116, the knowledge module 166, the AI module 194, the generative AI model(s) 164, the theme generator 162, and the UMP 158, that, when executed by the processor(s) 180, may perform operations on server computer 106 to implement one or more of the methods and processes described herein.

The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within the network 150. The network 150 may further include any number of hardwired and/or wireless connections. The network 150 may be, for example, communications networks having one or more types of topologies, including but not limited to the Internet, intranets, local area networks (LANs), cellular networks, Ethernet, Storage Area Networks (SANs), telephone networks, and Bluetooth personal area networks (PAN). In some implementations, two or more devices in a sub-network may be coupled by way of a wired connection, while at least some of the devices in the same sub-network are coupled by way of a local radio communication network (e.g., ZigBee, Z-Wave, Insteon, Bluetooth, Wi-Fi and other radio communication networks).

Figure 6:
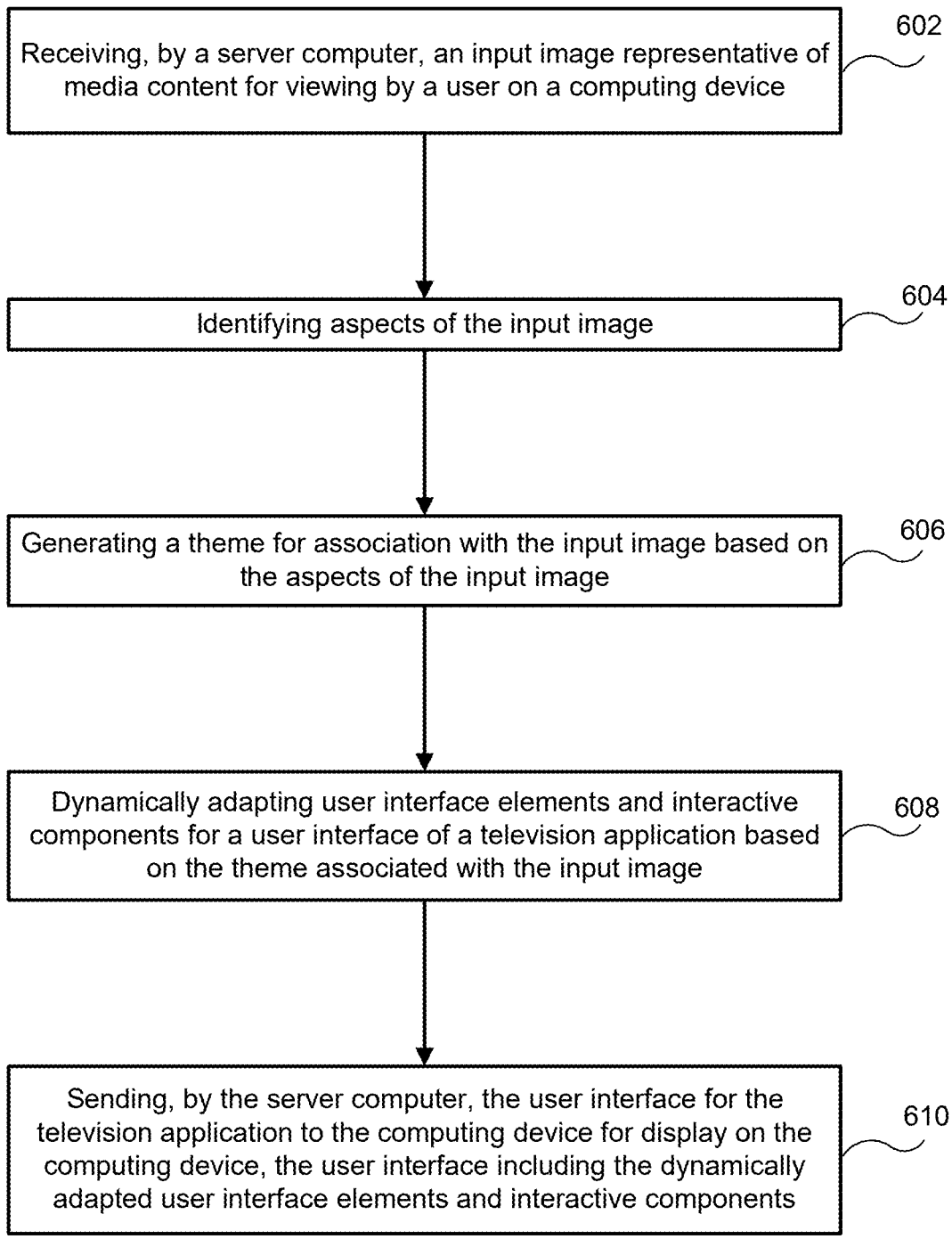
FIG. 6 illustrates a flowchart depicting example operations for determining and implementing a theme for a user interface for a TV application according to implementations described throughout this disclosure.

FIG. 6 illustrates a flowchart depicting example operations for determining and implementing a theme for a user interface for a TV application according to implementations described throughout this disclosure. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion. The operations may define a computer-implemented method. Although the flowchart 600 is described with reference to the system 100 of FIG. 1C, the flowchart 600 may be executed according to any of the figures discussed herein. In some examples, the operations of the flowchart 600 are executed by server computer 106.

Operation 602 includes receiving, by a server computer, an input image representative of media content for viewing by a user on a computing device.

Operation 604 includes identifying aspects of the input image.

Operation 606 includes generating a theme for association with the input image based on the aspects of the input image.

Operation 608 includes dynamically adapting user interface elements and interactive components for a user interface of a television application based on the theme associated with the input image.

Operation 610 includes sending, by the server computer, the user interface for the television application to the computing device for display on the computing device, the user interface including the dynamically adapted user interface elements and interactive components.

In some examples, the techniques described herein relate to a method including: receiving, by a server computer, an input image representative of media content for viewing by a user on a computing device; identifying aspects of the input image; generating a theme for association with the input image based on the aspects of the input image; dynamically adapting user interface elements and interactive components for a user interface of a television application based on the theme associated with the input image; and sending, by the server computer, the user interface for the television application to the computing device for display on the computing device, the user interface including the dynamically adapted user interface elements and interactive components.

In some examples, the techniques described herein relate to a method, wherein the user interface elements include at least one of a color, shape, typography, or iconography.

In some examples, the techniques described herein relate to a method, wherein the interactive components include at least one of a button or card.

In some examples, the techniques described herein relate to a method, wherein the aspects of the input image include parameters for use in defining the theme for the input image.

In some examples, the techniques described herein relate to a method, wherein a generative artificial intelligence framework generates the theme.

In some examples, the techniques described herein relate to a method, further including training the generative artificial intelligence framework using the parameters.

In some examples, the techniques described herein relate to a method, wherein an aspect of the input image is a color scheme for the input image.

In some examples, the techniques described herein relate to a method, further including applying a color scheme to the user interface based on the color scheme for the input image.

In some examples, the techniques described herein relate to a method, wherein the input image is one of a catalog of images representative of media content for viewing by the user.

In some examples, the techniques described herein relate to a method, wherein receiving the input image includes uploading the input image from a catalog of images associated with an account of the user.

In some examples, the techniques described herein relate to a non-transitory computer-readable medium storing executable instructions that when executed by at least one processor of a server computer cause the at least one processor to execute operations, the operations including: receiving an input image representative of media content for viewing by a user on a computing device; identifying aspects of the input image; generating a theme for association with the input image based on the aspects of the input image; dynamically adapting user interface elements and interactive components for a user interface of a television application based on the theme associated with the input image; and sending the user interface for the television application to the computing device for display on the computing device, the user interface including the dynamically adapted user interface elements and interactive components.

In some examples, the techniques described herein relate to a non-transitory computer-readable medium, wherein the user interface elements include at least one of a color, shape, typography, or iconography.

In some examples, the techniques described herein relate to a non-transitory computer-readable medium, wherein the interactive components include at least one of a button or card.

In some examples, the techniques described herein relate to a non-transitory computer-readable medium, wherein the aspects of the input image include parameters for use in defining the theme for the input image.

In some examples, the techniques described herein relate to a non-transitory computer-readable medium, wherein a generative artificial intelligence framework generates the theme; and wherein the operations further include training the generative artificial intelligence framework using the parameters.

In some examples, the techniques described herein relate to a non-transitory computer-readable medium, wherein an aspect of the input image is a color scheme for the input image; and wherein the operations further include applying a color scheme to the user interface based on the color scheme for the input image.

In some examples, the techniques described herein relate to a system including: at least one processor; and a non-transitory computer-readable medium storing instructions that when executed by the at least one processor cause the system to: receive an input image representative of media content for viewing by a user on a computing device; determine aspects of the input image; generate a theme for association with the input image based on the aspects of the input image; dynamically adapt user interface elements and interactive components for a user interface of a television application based on the theme associated with the input image; and send the user interface for the television application to the computing device for display on the computing device, the user interface including the dynamically adapted user interface elements and interactive components.

In some examples, the techniques described herein relate to a system, wherein the user interface elements include at least one of a color, shape, typography, or iconography.

In some examples, the techniques described herein relate to a system, wherein the interactive components include at least one of a button or card.

In some examples, the techniques described herein relate to a system, wherein the aspects of the input image include parameters for use in defining the theme for the input image; wherein a generative artificial intelligence framework generates the theme; and wherein the instructions that when executed by the at least one processor further cause the system to train the generative artificial intelligence framework using the parameters.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

Further to the descriptions above, a user may be provided with controls allowing the user to make an election as to both if and when systems, programs, or features described herein may enable collection of user information (e.g., a user's preferences, a user's current location, a user's credentials, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city. ZIP code, or state level), so that a particular location of a user cannot be determined. Thus, the user may have control over what information is collected about the user, how that information is used, and what information is provided to the user.

What is claimed is:

1. A method comprising:
    receiving, by a server computer, an input image representative of preferred media content for viewing by a user on a computing device;
    determining, by a generative artificial intelligence framework, aspects of the input image;
    extracting, by the generative artificial intelligence framework, at least one parameter from the input image based on the aspects of the input image;
    generating at least one theme parameter for association with the input image based on at least one parameter from the input image;
    dynamically adapting user interface elements and interactive components for a user interface of a television application based on the at least one theme parameter; and
    sending, by the server computer, the user interface for the television application to the computing device for display on the computing device, the user interface including the dynamically adapted user interface elements and interactive components.

2. The method of claim 1, wherein the user interface elements include at least one of a color, shape, typography, or iconography.

3. The method of claim 1, wherein the interactive components include at least one of a button or card.

4. The method of claim 1, further comprising training the generative artificial intelligence framework using the at least one parameter.

5. The method of claim 1, wherein determining, by the generative artificial intelligence framework, aspects of the input image comprises determining a color scheme for the input image.

6. The method of claim 5, further comprising applying the color scheme to the user interface of the television application.

7. The method of claim 1, wherein the input image is one of a catalog of images representative of media content for viewing by the user.

8. The method of claim 1, wherein receiving the input image comprises uploading the input image from a catalog of images associated with an account of the user.

9. A non-transitory computer-readable medium storing executable instructions that when executed by at least one processor of a server computer cause the at least one processor to execute operations, the operations comprising:
    receiving an input image representative of media content for viewing by a user on a computing device;
    determining, by a generative artificial intelligence framework, aspects of the input image;
    extracting, by the generative artificial intelligence framework, at least one parameter from the input image based on the aspects of the input image;
    generating at least one theme parameter for association with the input image based on the at least one parameter from the input image;
    dynamically adapting user interface elements and interactive components for a user interface of a television application based on the at least one theme parameter; and
    sending the user interface for the television application to the computing device for display on the computing device, the user interface including the dynamically adapted user interface elements and interactive components.

10. The non-transitory computer-readable medium of claim 9, wherein the user interface elements include at least one of a color, shape, typography, or iconography.

11. The non-transitory computer-readable medium of claim 9, wherein the interactive components include at least one of a button or card.

12. The non-transitory computer-readable medium of claim 9,
    wherein the operations further comprise training the generative artificial intelligence framework using the at least one parameter.

13. The non-transitory computer-readable medium of claim 9,
    wherein determining, by the generative artificial intelligence framework, aspects of the input image comprises determining a color scheme for the input image; and
    wherein the operations further comprise applying the color scheme to the user interface of the television application.

14. A system comprising:
   at least one processor; and
   a non-transitory computer-readable medium storing instructions that when executed by the at least one processor cause the system to:
      receive an input image representative of media content for viewing by a user on a computing device;
      determine, by a generative artificial intelligence framework, aspects of the input image;
      extract, by the generative artificial intelligence framework, at least one parameter from the input image based on the aspects of the input image;
      generate at least one theme parameter for association with the input image based on the at least one parameter from the input image;
      dynamically adapt user interface elements and interactive components for a user interface of a television application based on the at least one theme parameter; and
      send the user interface for the television application to the computing device for display on the computing device, the user interface including the dynamically adapted user interface elements and interactive components.

15. The system of claim 14, wherein the user interface elements include at least one of a color, shape, typography, or iconography.

16. The system of claim 14, wherein the interactive components include at least one of a button or card.

17. The system of claim 14,
   wherein the instructions that when executed by the at least one processor further cause the system to train the generative artificial intelligence framework using the at least one parameter.

18. The system of claim 14, wherein determining, by the generative artificial intelligence framework, aspects of the input image comprises determining a color scheme for the input image.

19. The system of claim 18, wherein the instructions that when executed by the at least one processor further cause the system to apply the color scheme to the user interface of the television application.

20. The method of claim 1, wherein the at least one parameter from the input image is representative of at least one element of the input image.

* * * * *